United States Patent
Zubas et al.

(10) Patent No.: US 8,565,732 B2
(45) Date of Patent: *Oct. 22, 2013

(54) ALTERNATE VOICEMAIL DEPOSIT NOTIFICATION FOR ROAMING MOBILE DEVICES

(71) Applicant: AT&T Intellectual Property I, LP, Atlanta, GA (US)

(72) Inventors: Michael Zubas, Marietta, GA (US); Jacqueline Jackson, Somerset, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/687,482

(22) Filed: Nov. 28, 2012

(65) Prior Publication Data

US 2013/0090096 A1    Apr. 11, 2013

Related U.S. Application Data

(63) Continuation of application No. 12/638,404, filed on Dec. 15, 2009, now Pat. No. 8,346,222.

(51) Int. Cl.
*H04M 11/10* (2006.01)

(52) U.S. Cl.
USPC ............... 455/413; 455/432.1; 455/412.2; 455/414.1; 379/88.16; 379/88.19; 379/100.06

(58) Field of Classification Search
USPC ............. 455/413, 432.1, 412.2, 414.1; 379/88.16, 88.19, 100.06
See application file for complete search history.

(56) References Cited

U.S. PATENT DOCUMENTS

| | | | |
|---|---|---|---|
| 7,248,857 B1 | 7/2007 | Richardson et al. | |
| 8,155,624 B2 | 4/2012 | Khoury | |
| 8,346,222 B2 * | 1/2013 | Zubas et al. | 455/413 |
| 2010/0285778 A1 | 11/2010 | Bluvband et al. | |

* cited by examiner

*Primary Examiner* — Amancio Gonzalez
(74) *Attorney, Agent, or Firm* — Parks IP Law LLC; Jennifer P. Medlin, Esq.

(57) ABSTRACT

Systems and methods allow a roaming mobile device to communicate with a visual voicemail (VVM) system to inform the VVM system of its roaming status. The VVM system then suspends VVM service for the voicemail account associated with the roaming mobile device and instructs a notification server to notify the roaming mobile device if a voicemail message is deposited into a voicemail box associated with the voicemail account.

20 Claims, 3 Drawing Sheets

ALTERNATE VOICEMAIL DEPOSIT NOTIFICATION FOR ROAMING MOBILE DEVICES

TECHNICAL FIELD

The present disclosure relates generally to voicemail and, more particularly, to an alternate voicemail deposit notification method for roaming mobile devices.

BACKGROUND

Voicemail systems allow a calling party to leave a voicemail message for a called party if the called party is unavailable to answer an incoming call. Typically, a calling party places a call to a desired called party using a landline or wireless telephone and, after a predetermined number of unanswered rings, the host network routes the call to a voicemail system that includes a voicemail box for the called party. The voicemail system plays a default or custom greeting that prompts the calling party to leave a voicemail message. The voicemail message is recorded and stored in association with the called party's voicemail box for retrieval by the called party.

Traditional voicemail systems (referred to herein as plain-old voicemail or POVM systems) allow users to retrieve messages stored in his or her voicemail box using a telephone user interface (TUI). Users are able to listen to messages, skip messages, delete messages, and save messages using the TUI. TUIs also provide functions for users to set a voicemail greeting, record a voicemail greeting, record a name, and set/change a voicemail password.

Other voicemail systems allow a user to access voicemail messages directly from their mobile device without having to call a voicemail system. Such systems are commonly referred to as visual voicemail (VVM) systems. In these systems, a calling party leaves a voicemail message in a typical manner as described above. The VVM system then sends the voicemail message in an appropriate audio file format to the user's mobile device for storage and retrieval. Alternatively, the VVM system sends header information including, for example, the calling party, length of the voicemail message, the date and time the voicemail message was recorded, and any necessary details regarding the host VVM system that the mobile device needs to retrieve the voicemail message. When the called party selects the voicemail message from the mobile device, the mobile device uses the header information to contact the VVM system and request the voicemail audio content associated with the voicemail message. The VVM system sends the voicemail audio content in an appropriate audio file format to the mobile device. The VVM system may alternatively stream the voicemail audio content to the mobile device.

When the user travels to a different country or within the same country with their mobile device, the user's home network may not have coverage in the visited area. Carriers often establish roaming agreements with foreign carriers so that their subscribers are still able to make and receive calls while roaming onto another carrier's network (foreign network), in the visited area. A foreign network, therefore, may be in another country, requiring international roaming, or may be a network operated by another carrier in the same country, requiring domestic roaming.

When a subscriber powers on their mobile device in the visited area, the mobile device receives radio signals from one or more foreign networks operating in that area. After one of the foreign networks is selected by the mobile device, the carrier of the selected network authenticates the user's mobile device with the user's home carrier including, for example, determining whether the user is a valid user with roaming capability enabled for their account. If the home carrier responds with a positive authentication, the user is permitted to use his or her mobile device on the foreign carrier network. For billing, the foreign carrier will keep a record of all calls and other activity from the user's mobile device and send the record along with the corresponding charges to the user's home carrier. The home carrier aggregates these charges for billing to the user.

At present, when a mobile device is configured for VVM service and the mobile device is roaming, the mobile device may lose access to VVM service due to data connectivity being unavailable in the foreign network. VVM service may also be inaccessible due to network incompatibilities or VVM interoperability equipment being unavailable between the foreign and home networks.

In these situations, for example, if a user receives a voicemail message, the voicemail system cannot send the voicemail message to the user's mobile device. As such, the user must call-in to the voicemail system to check whether a voicemail message has been deposited. The only indication to the user that a voicemail message may have been deposited is the presence of a missed call notification on his or her mobile device. This can lead to missed voicemail messages if the user does not actively check the voicemail system each time a call is missed. This can also lead to increased network traffic due to users having to constantly check the voicemail system for new voicemail messages. The increased network traffic can also lead to undesirable roaming charges for calls to the voicemail system.

SUMMARY

When a call is placed to a mobile device operating on a home network, the call is routed to the mobile device for a specified number of rings. If no answer is received, the call is forwarded to a visual voicemail (VVM) system, particularly, to a voicemail box associated with a voicemail account established for the mobile device user. A voicemail greeting is played for the calling party and the calling party is provided the option to leave a voicemail message. If no voicemail message is recorded, the voicemail box is left unchanged and no further action is taken. If, however, the calling party leaves a voicemail message, the voicemail system records the voicemail message and sends the voicemail message to the mobile device in accordance with VVM message delivery procedures.

When a call is placed to a roaming mobile device, operating on a foreign network, the call is routed to the roaming mobile device for a specified number of rings. If no answer is received, the call is forwarded to the VVM system and directed to the user's voicemail box. A voicemail greeting is played for the calling party and the calling party is provided the option to leave a voicemail message. If no voicemail message is recorded, the voicemail box is left unchanged and no further action is taken. If, however, the calling party leaves a voicemail message, the VVM system records the voicemail message and attempts to send the voicemail message to the roaming mobile device in accordance with VVM message delivery procedures.

In this scenario, the roaming mobile device may not have access to VVM service for various reasons. For example, the roaming mobile device may not have data access through the foreign network or the foreign network and the home network may not have established interoperability equipment to provide visual voicemail service through the foreign network. In any case, although the VVM system may attempt to send the voicemail message to the roaming mobile device, the VVM system will be unable to successfully deliver the voicemail message to the roaming mobile device without an established data connection.

In these situations, the user must call the VVM system via a telephone user interface (TUI) to check whether a voicemail message has been deposited. Moreover, the only indication provided to the user that a voicemail message may have been deposited is a missed call notification presented on the roaming mobile device when any call is missed. This can lead to missed voicemail messages, if the user does not call the VVM system each time a call is missed to check for voicemail messages. This can also lead to increased network traffic due to users having to constantly check the VVM system for new voicemail messages. This, in turn, may lead to increased roaming charges for each call routed by the foreign network to the VVM system operating in the user's home network.

Methods presented herein allow a roaming mobile device to communicate with the VVM system to inform the VVM system of its roaming status. The VVM system then suspends VVM service for the voicemail account associated with the roaming mobile device and instructs a notification server to notify the roaming mobile device if a voicemail message is deposited into a voicemail box associated with the voicemail account.

In other situations, a foreign network may provide data access, but the data roaming charges levied by the foreign carrier for data access may be prohibitively expensive or otherwise undesirable to the roaming user. Methods presented herein allow selective suspension of VVM service when a mobile device is roaming.

According to one embodiment of the present disclosure, a method includes a VVM system receiving a roaming status message from a mobile device. The roaming status message indicates that the mobile device is roaming. The method also includes VVM system suspending the VVM service for the mobile device, in response to receiving the roaming status message, receiving a voicemail message directed to a voicemail account associated with the mobile device, and sending a notification message to the mobile device to notify the mobile device of the voicemail message.

In some embodiments, the VVM system receives the roaming status message from the mobile device via a notification server. In some embodiments, the VVM system receives the roaming status message formatted as a short message service (SMS) message, a universal unstructured supplementary data (USSD) message, a multimedia message service (MMS) message, an email message, or a proprietary message.

In some embodiments, the VVM system receives the roaming status message via a data channel. In other embodiments, the VVM system receives the roaming status message via a signaling channel.

In some embodiments, the VVM system suspends the VVM service for the mobile device for a time period specified in the roaming status message. In some embodiments, the VVM system suspends the VVM service for the mobile device until a subsequent message is received from the mobile device instructing the VVM system to re-activate the VVM service for the voicemail account.

In some embodiments, the VVM system sends the notification message to the mobile device to notify the mobile device of the voicemail message in an SMS format, a USSD format, an MMS format, an email format, or a proprietary format.

In some embodiments, the VVM system sends the notification message to the mobile device with instructions to display a visual notification on a display of the mobile device. In some embodiments, the visual notification is a message waiting indicator. In some embodiments, the VVM system sends the notification message to the mobile device with instructions to play an audio notification through a speaker of the mobile device.

According to another embodiment of the present disclosure, a VVM system includes a processor and a memory for storing computer readable instructions. Execution of the computer readable instructions by the processor make the VVM system operable to receive a roaming status message from a mobile device, suspend a VVM service for the mobile device, receive a voicemail message directed to a voicemail account associated with the mobile device, and send a notification message to the mobile device to notify the mobile device of the voicemail message.

In some embodiments, the instructions to make the VVM system operable to receive the roaming status message include instructions, executable by the processor to make the VVM system operable to receive the roaming status message formatted as an SMS message, a USSD message, an MMS message, an email message, or a proprietary message.

In some embodiments, the instructions to make the VVM system operable to receive the roaming status message include instructions, executable by the processor to make the VVM system operable to receive the roaming status message via a data channel. In some embodiments, the instructions to make the VVM system operable to receive the roaming status message include instructions, executable by the processor to make the VVM system operable to receive the roaming status message via a signaling channel.

In some embodiments, the instructions to make the VVM system operable to suspend the VVM service include instructions, executable by the processor to make the VVM system operable to suspend the VVM service for a time period specified in the roaming status message. In some embodiments, the instructions to make the VVM system operable to suspend the VVM service include instructions, executable by the processor to make the VVM system operable to suspend the VVM service until a subsequent message is received from the mobile device instructing the VVM system to re-activate the VVM service for the voicemail account.

In some embodiments, the instructions to make the VVM system operable to send the notification message to the mobile device include instructions, executable by the processor to make the VVM system operable to send the notification message to the mobile device in an SMS format, a USSD format, an MMS format, an email format, or a proprietary format.

In some embodiments, the instructions to make the VVM system operable to send the notification message to the mobile device include instructions, executable by the processor to make the VVM system operable to send the notification message to the mobile device with instructions to display a visual notification on a display of the mobile device. In some embodiments, the instructions to make the VVM system operable to send the notification message to the mobile device include instructions, executable by the processor to make the VVM system operable to send the notification message to the mobile device with instructions to play an audio notification through a speaker of the mobile device.

DETAILED DESCRIPTION

As required, detailed embodiments of the present disclosure are provided herein. The disclosed embodiments are merely examples that may be embodied in various and alternative forms, and combinations thereof. As used herein, for example, exemplary, and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the devices and methods of the present disclosure. Therefore, specific structural and functional details disclosed herein are not to be interpreted as limiting, but merely as a basis for the claims and as a representative basis for teaching one skilled in the art to variously employ the present disclosure.

The systems and methods of the present disclosure may be implemented in wireless networks that use exemplary telecommunications standards, such as Global System for Mobile communications (GSM) and an universal Mobile Telecommunications System (UMTS). It should be understood, however, that the systems and methods may be implemented in wireless networks that use any existing or yet to be developed telecommunications technology. Some examples of other suitable telecommunications technologies include, but are not limited to, networks utilizing Time Division Multiple Access (TDMA), Frequency Division Multiple Access (FDMA), Wideband Code Division Multiple Access (WCDMA), Orthogonal Frequency Division Multiplexing (OFDM), Long Term Evolution (LTE), and various other 2G, 2.5G, 3G, 4G, and future generation technologies. Examples of suitable data bearers include, but are not limited to, General Packet Radio Service (GPRS), Enhanced Data rates for Global Evolution (EDGE), the High-Speed Packet Access (HSPA) protocol family, such as, High-Speed Downlink Packet Access (HSPDA), Enhanced Uplink (EUL) or otherwise termed High-Speed Uplink Packet Access (HSUPA), Evolved HSPA (HSPA+), and various other current and future data bearers.

While the methods described herein may, at times, be described in a general context of computer-executable instructions, the methods of the present disclosure can also be implemented in combination with other program modules and/or as a combination of hardware and software. The term application, or variants thereof, is used expansively herein to include routines, program modules, programs, components, data structures, algorithms, and the like. Applications can be implemented on various system configurations, including servers, network systems, single-processor or multiprocessor systems, minicomputers, mainframe computers, personal computers, hand-held computing devices, mobile devices, microprocessor-based, programmable consumer electronics, combinations thereof, and the like.

Figure 1:
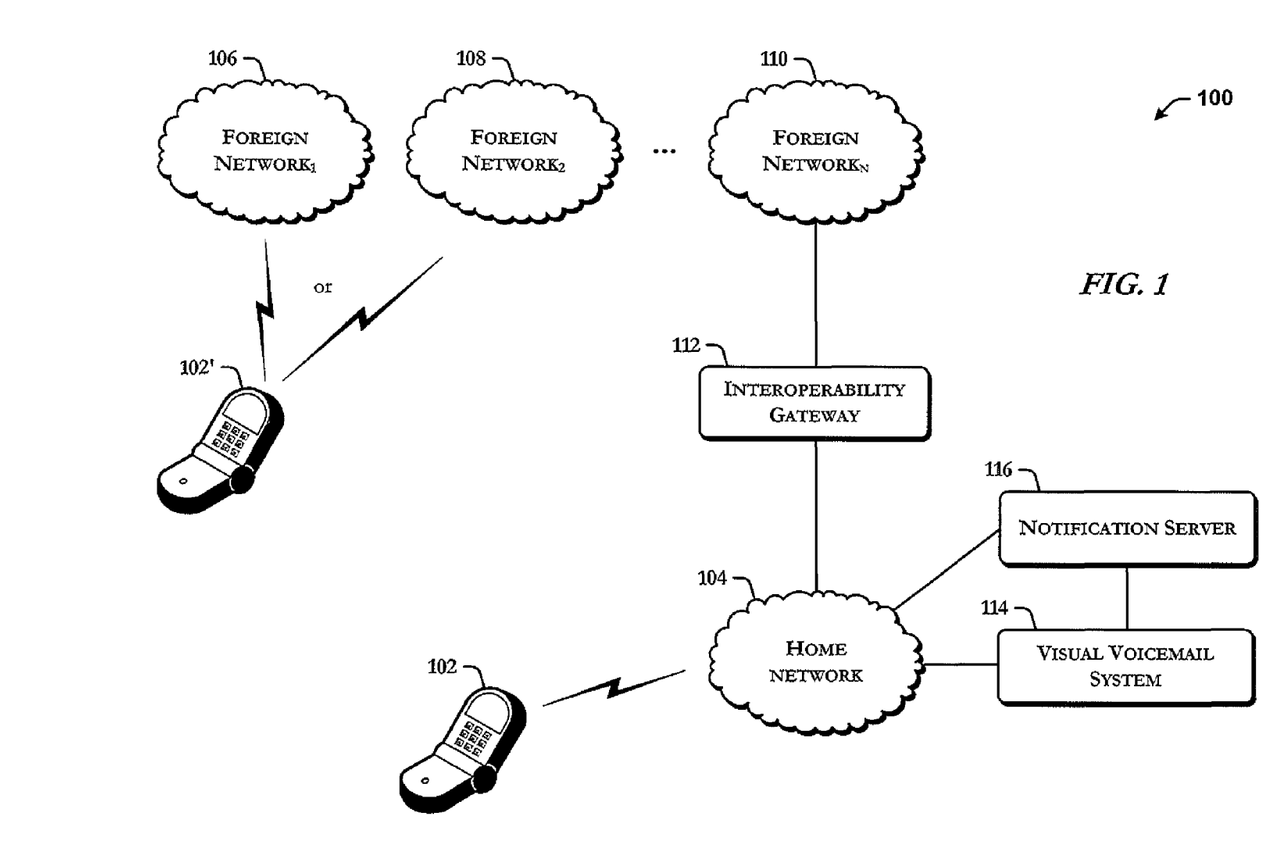
FIG. 1 schematically illustrates an exemplary wireless communications network system.

Referring now to FIG. 1, an exemplary wireless communications network system 100 is illustrated. The wireless communications network system 100 provides a suitable environment in which the disclosed methods are implemented. As illustrated, the system 100 includes a mobile device 102, such as a cellular telephone, wireless messaging device, computer of any form factor (e.g., laptop, notebook, netbook, subnotebook, etc.), or the like. The mobile device 102 is compatible with voicemail services including a plain-old voicemail (POVM) service and a visual voicemail (VVM) service. As a computer, the mobile device 102 may be configured with a fixed or removable network access card. In this embodiment, the computer may also be configured with voicemail software to support POVM and VVM services.

The mobile device 102 is configured to communicate with a home network 104 operated by a home carrier. When the mobile device 102 travels outside of the home network 104 and is roaming, the roaming mobile device 102' can attach to a foreign network, such as one of the illustrated foreign networks 106, 108, 110 (denoted Foreign Network$_1$, ... Foreign Network$_N$, where N is a positive integer) provided by one or more foreign carriers. The foreign networks 106, 108, 110 may be in another country, requiring international roaming for the roaming mobile device 102', or may be a network operated by another carrier in the same country as the home network 104, requiring domestic roaming for the roaming mobile device 102'.

The home network 104 communicates with the foreign network 110 (exemplary, hereinafter, of any of the illustrated foreign networks 106, 108, 110) via an interoperability gateway 112, such as a gateway mobile switching center (GMSC), gateway GPRS support node (GGSN), or other network gateway element. By this communication, the foreign network 110 is provided access to a visual voicemail (VVM) system 114 of the home network 104.

In some embodiments, the VVM system 114 is a combination of hardware (e.g., processor(s), memory module(s), and network interface(s)) and software (e.g., operating system, voicemail application software) configured to provide VVM service in accordance with VVM procedures. In some embodiments, the VVM system 114 includes a telephony server for handling incoming voicemail inquiries via a telephone user interface (TUI) and a storage server for storing and managing voicemail messages for a plurality of voicemail accounts (servers not shown). In some embodiments, the VVM system 114 is configured to store a plurality of voicemail accounts. Each voicemail account includes one or more voicemail boxes in which voicemail messages are deposited for a voicemail user/subscriber. The number of voicemail messages capable of being stored per account may be determined by the voicemail service provider, such as the home network carrier, or a third party provider such as the voicemail system manufacturer, vendor, or voicemail system operator, for example. The maximum voicemail message length may also be set by the voicemail service provider.

In some embodiments, the VVM system 114 is accessible via a TUI, as is typical for POVM access. In other embodiments, the VVM system 114 is accessible via the mobile device 102, 102' by way of a VVM application on the mobile device 102, 102'.

The VVM system 114 maintains message states for each voicemail message. Message states include, but are not limited to, an unheard—new state, a skipped state, and a saved—read state. Messages may be retrieved, listened to, and deleted from the VVM system 114, for example, via the TUI or via the VVM application on the mobile device 102, 102'.

The VVM system 114 is in communication with a notification server 116. The notification server 116 is a combination of hardware and software and may be embodied as a short message service center (SMSC), a multimedia message service center (MMSC), an unstructured supplementary service data (USSD) center, an email server, a proprietary protocol server, or any combination of thereof. Generally, the notification server 116 is configured to receive instructions from the VVM system 114 to notify the roaming mobile device 102' that a voicemail message has been deposited into the voicemail box associated with the voicemail account of the roaming mobile device 102' user, to generate a notification message, and to send the notification message to the roaming mobile device 102'.

In some embodiments, the notification message is sent to the roaming mobile device 102' over a signaling channel, for example, via a message delivery protocol, such as SMS or USSD. A USSD message may be formatted as a special-purpose USSD code using a star code format (e.g., *ALPHANUMERIC CODE#). In other embodiments, the notification message is sent to the roaming mobile device 102' over a shared or dedicated data channel. In still other embodiments, the notification message is sent to the roaming mobile device 102' as an email message or via a proprietary protocol. In other embodiments, the notification message is sent to the roaming mobile device 102' as a special-purpose text message, such as a message waiting indicator (MWI) message. The notification message may be displayed on a display of the roaming mobile device 102' as an icon or other visual representation to indicate that a voicemail message has been deposited into the user's voicemail box. Additionally or alternatively, the notification message may trigger a sound to be played through a speaker of the roaming mobile device 102' to indicate that a voicemail message has been deposited into the user's voicemail box.

Figure 2:
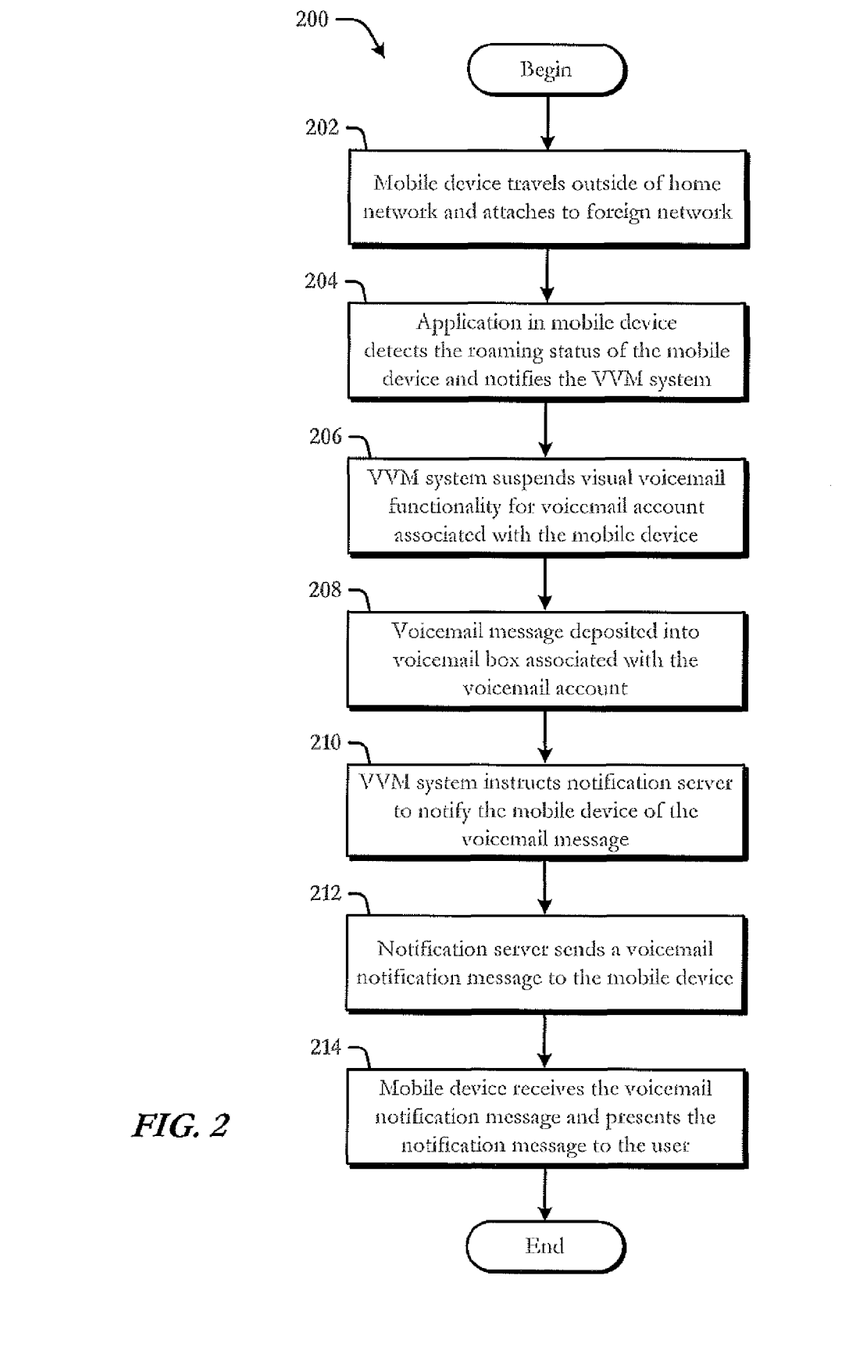
FIG. 2 schematically illustrates an exemplary method for providing a voicemail notification to a roaming mobile device.

Referring now to FIG. 2, a method 200 for providing a voicemail notification to a roaming mobile device is illustrated. It should be understood that the steps of the method 200 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated method 200 can be ended at any time. In certain embodiments, some or all steps of this process, and/or substantially equivalent steps are performed by execution, by a processor, of computer-readable instructions stored or included on a computer-readable medium, such as a memory of the roaming mobile device 102' and/or a memory of the VVM system 114.

The method 200 begins and flow proceeds to block 202, whereat the mobile device 102 travels outside the home network 104 and into an area serviced by one or more foreign networks 106, 108, 110 operated by one or more foreign carriers. The roaming mobile device 102' attaches to one of the foreign networks 106, 108, 110 and flow proceeds to block 204.

At block 204, an application (e.g., a visual voicemail application, messaging application, or other application) in the roaming mobile device 102' detects the roaming status of the roaming mobile device 102' and generates a roaming status message directed to the VVM system 114 to notify the VVM system 114 of the roaming status. In some embodiments, the roaming mobile device 102' sends the roaming status message to the notification server 116 with instructions for routing the message to the VVM system 114. In some embodiments, the roaming status message is formatted by the roaming mobile device 102' into an SMS message, a USSD message, an MMS message, an email message, or in a proprietary message format and sent to the notification server 116 or directly to the VVM system 114. The roaming status message may be sent over a shared or dedicated data channel or a signaling channel.

At block 206, the VVM system 114 receives the roaming status message directly from the roaming mobile device 102', or by way of the notification server 116, and routes the message internally to the voicemail account associated with the roaming mobile device 102' user. In response to receiving the roaming status message, the VVM system 114 suspends VVM functionality for the user's voicemail account. In some embodiments, the VVM system 114 suspends VVM functionality for a time period specified in the roaming status message received from the roaming mobile device 102'. In other embodiments, the VVM system 114 is configured to suspend VVM functionality until a subsequent message is received from the roaming mobile device 102' instructing the VVM system 114 to re-activate VVM functionality for the user's voicemail account.

At block 208, a voicemail message is deposited into a voicemail box associated with the user's voicemail account on the VVM system 114. In response to the voicemail message being deposited, the VVM system 114, at block 210, instructs the notification server 116 to notify the roaming mobile device 102' of the voicemail message. At block 212, the notification server 116 generates and sends a notification message to the roaming mobile device 102'. At block 214, the roaming mobile device 102' receives the notification message and presents (e.g., displays for visual notification or plays for audio notification) the notification message to the user.

Figure 3:
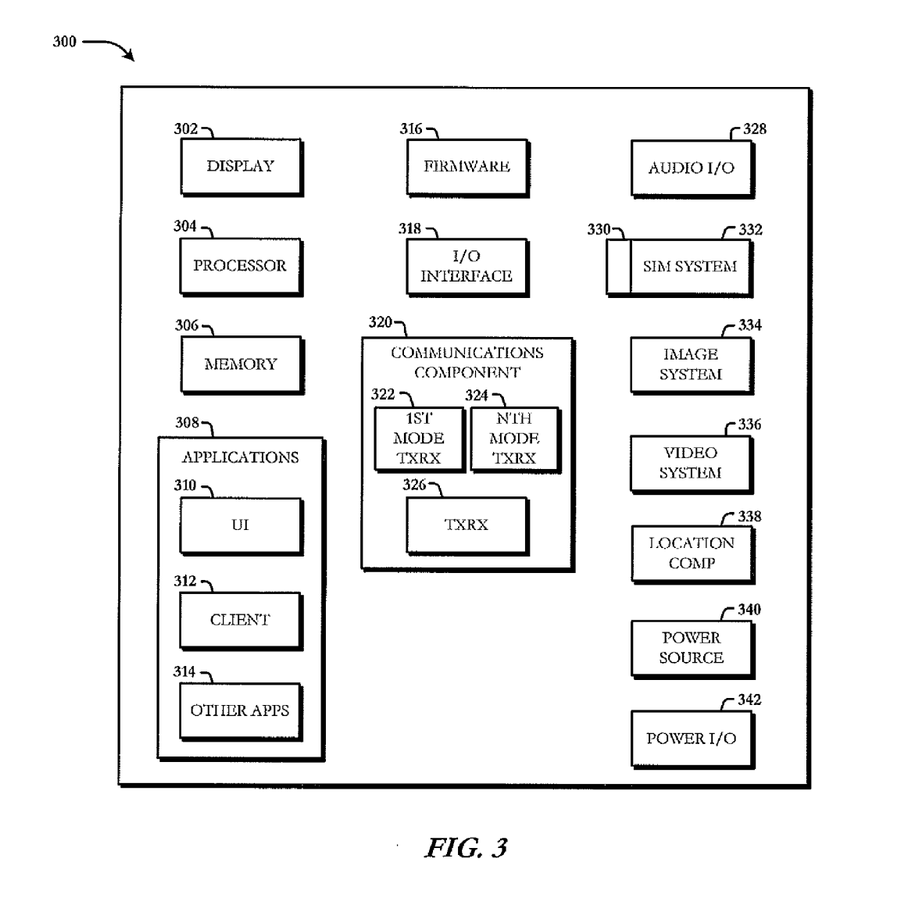
FIG. 3 schematically illustrates an exemplary mobile device and components thereof.

Referring now to FIG. 3, a schematic block diagram of an exemplary mobile device 300 is illustrated. Although connections are not shown between the components illustrated in FIG. 3, the components can interact with each other to carry out device functions. In some embodiments, for example, the components are arranged so as to communicate via one or more busses (not shown). It should be understood that FIG. 3 and the following description are intended to provide a general understanding of a suitable environment in which the various aspects of some embodiments of the present disclosure can be implemented.

In some embodiments, the mobile device 102, 102' illustrated in FIG. 1 is configured like the mobile device 300, now described in detail. In some embodiments, the mobile device 300 is a multimode headset and has a variety of computer readable media, including, for example, volatile media, non-volatile media, removable media, and non-removable media. The term computer-readable media and variants thereof, as used in the specification and claims, refer to storage media and communication media. In some embodiments, storage media includes volatile and/or non-volatile, removable, and/or non-removable media. For example, storage media includes random access memory (RAM), read-only memory (ROM), electrically erasable programmable read-only memory (EEPROM), solid state memory or other memory technology, CD ROM, DVD, or other optical disk storage, magnetic tape, magnetic disk storage or other magnetic storage devices, or any other medium that can be used to store the desired information and that can be accessed by the mobile device 300.

As illustrated in FIG. 3, the mobile device 300 includes a display 302 for displaying multimedia such as, for example, voicemail notification messages, application graphical user interfaces (GUIs), text, images, video, telephony functions, such as Caller ID data, setup functions, menus, voicemail message waiting identifiers (MWIs), music, metadata, messages, wallpaper, graphics, Internet content, device status, preferences settings, map and location data, profile (e.g., vibrate, silent, loud) selection, and the like. The display 302 may display visual voicemail data in visual voicemail headers, such as the date, time, message length, message status (i.e., new-unread, read, saved, or deleted), and calling line identity (CLI) information. The illustrated mobile device 300 also includes a processor 304 for processing data and/or executing computer-executable instructions of one or more applications 308, and a memory 306 for storing data and/or one or more of the applications.

In some embodiments, the application(s) 308 include a user interface (UI) application 310. The UI application 310 interfaces with a client 312 (e.g., an operating system (OS)) to facilitate user interaction with device functionality and data. In some embodiments, the client 312 is one of Symbian OS, Microsoft® Windows® Mobile OS (available from Microsoft Corporation of Redmond, Wash.), Palm® webOS™ (available from Palm Corporation of Sunnyvale, Calif.), Palm® OS (available from Palm Corporation), RIM® BlackBerry® OS (available from Research In Motion Limited of Waterloo, Ontario, Canada), Apple® iPhone® OS (available from Apple Corporation of Cupertino, Calif.), or Google Android™ OS (available from Google Inc. of Mountain View, Calif.). These operating systems are merely exemplary of the operating systems that may be used in accordance with the embodiments disclosed herein.

The UI application 310 aids a user in entering message content, viewing received messages (e.g., multimedia messages, SMS messages, visual voicemail messages), managing voicemails in a visual voicemail application, answering/initiating calls, entering/deleting data, entering and setting user IDs and passwords for device access, configuring settings, manipulating address book content and/or settings, multimode interaction, interacting with other applications 314, and the like. In some embodiments, the other applications 314 include, for example, visual voicemail applications, messaging applications (e.g., SMS, EMS, MMS applications), presence applications, text-to-speech applications, speech-to-text applications, add-ons, plug-ins, email applications, music applications, video applications, camera applications, location service applications (LSAs), power conservation applications, game applications, productivity applications, entertainment applications, enterprise applications, combinations thereof, and the like. The applications 308 are stored in the memory 306 and/or in a firmware 316, and are executed by the processor 304. The firmware 316 may also store code for execution during device power up, for example.

The illustrated mobile device 300 also includes an input/output (I/O) interface 318 for input/output of data, such as, for example, voicemail account information requests, visual voicemail management, location information, presence status information, user IDs, passwords, and application initiation (start-up) requests. In some embodiments, the I/O interface 318 is a hardwire connection, such as, for example, a USB, mini-USB, audio jack, PS2, IEEE 1394, serial, parallel, Ethernet (RJ48) port, RJ11 port, or the like. In some embodiments, the I/O interface 318 accepts other I/O devices such as, for example, keyboards, keypads, mice, interface tethers, stylus pens, printers, thumb drives, touch screens, multi-touch screens, touch pads, trackballs, joysticks, microphones, remote control devices, monitors, displays, liquid crystal displays (LCDs), combinations thereof, and the like. It should be appreciated that the I/O interface 318 may be used for communications between the mobile device 300 and a network or local device, instead of, or in addition to, a communications component 320.

The communications component 320 interfaces with the processor 304 to facilitate wired/wireless communications with external systems. Example external systems include, but are not limited to, intranets, network databases, network storage systems, cellular networks, location servers, presence servers, Voice over Internet Protocol (VoIP) networks, local area networks (LANs), wide area networks (WANs), metropolitan area networks (MANs), personal area networks (PANs), and other networks. In some embodiments, the external systems are implemented using WIFI, WIMAX, combinations and/or improvements thereof, and the like. In some embodiments, the communications component 320 includes a multimode communications subsystem for providing cellular communications via different cellular technologies. In some embodiments, for example, a first cellular transceiver 322 operates in one mode, such as, GSM, and an Nth cellular transceiver 324 operates in a different mode, such as UMTS. While only two cellular transceivers 322, 324 are illustrated, it should be appreciated that a plurality of transceivers can be included.

The illustrated communications component 320 also includes an alternative communications transceiver 326 for use by other communications technologies such as, for example, WIFI, WIMAX, BLUETOOTH, infrared, infrared data association (IRDA), near field communications (NFC), RF, and the like. In some embodiments, the communications component 320 also facilitates reception from terrestrial radio networks, digital satellite radio networks, Internet-based radio services networks, combinations thereof, and the like.

The communications component 320 processes data from a network such as, for example, the Internet, an intranet (e.g., business intranet), a home broadband network, a WIFI hotspot, and the like, via an ISP, DSL provider, or broadband provider. In some embodiments, the communications component 320 facilitates the transmission of authentication information from the mobile device 300 to a network for processing in accordance with the methods described herein.

Audio capabilities for the mobile device 300 can be provided by an audio I/O component 328 that includes a speaker for the output of audio signals and a microphone to collect audio signals.

The illustrated mobile device 300 also includes a slot interface 330 for accommodating a subscriber identity system 332 such as, for example, a subscriber identity module (SIM) card, universal SIM (USIM) card, or universal integrated circuit card (UICC) including one or more SIM applications (e.g., ISIM, SIM, USIM, CSIM). Alternatively, the subscriber identity system 332 may be manufactured into the mobile device 300, thereby obviating the need for a slot interface 330. In some embodiments, the subscriber identity system 332 is programmed by a manufacturer, a retailer, a user, a computer, a network operator, or the like. The subscriber identity system 332 may be configured to store voicemail account information, contact information for the user and/or address book contacts, and/or other information.

The illustrated mobile device 300 also includes an image capture and processing system 334 (image system). Photos may be obtained via an associated image capture subsystem of the image system 334, for example, a camera. The illustrated mobile device 300 also includes a video system 336 for capturing, processing, recording, modifying, and/or transmitting video content. Photos and videos obtained using the image system 334 and the video system 336, respectively, may be added as message content to an MMS message and sent to another mobile device.

The illustrated mobile device 300 also includes a location component 338 for sending and/or receiving signals such as, for example, GPS data, assisted GPS (A-GPS) data, WIFI/

WIMAX and/or cellular network triangulation data, combinations thereof, and the like, for determining a location of the mobile device 300. In some embodiments, the location component 338 interfaces with cellular network nodes, telephone lines, satellites, location transmitters and/or beacons, wireless network transmitters and receivers, for example, WIFI hotspots, radio transmitters, combinations thereof, and the like. Using the location component 338, the mobile device 300 obtains, generates, and/or receives data to identify its location, or transmits data used by other devices to determine the location of the mobile device 300.

The illustrated mobile device 300 also includes a power source 340, such as batteries and/or other power subsystem (AC or DC). The power source 340 can interface with an external power system or charging equipment via a power I/O component 342.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A system comprising:
a processor; and
a computer-readable storage medium comprising computer-executable instructions that, when executed by the processor, cause the processor to perform operations comprising:
receiving a roaming status message associated with a roaming mobile device;
suspending, in response to receiving the roaming status message, a voicemail functionality of a voicemail account associated with the roaming mobile device; and
reactivating, in response to a trigger condition being met, the voicemail functionality.

2. The system of claim 1, wherein the roaming status message comprises the trigger condition for reactivating the voicemail functionality.

3. The system of claim 2, wherein:
the trigger condition comprises a time period for suspending the voicemail functionality;
suspending the voicemail functionality comprises suspending the voicemail functionality for the time period; and
reactivating the voicemail functionality is performed in response to expiration of the time period.

4. The system of claim 1, wherein:
the trigger condition is one of multiple trigger conditions, included in the roaming status message, for reactivating the voicemail account; and
reactivating the voicemail functionality is performed in response to any of the multiple trigger conditions being met.

5. The system of claim 1, wherein:
the trigger condition comprises a subsequent message, from the roaming mobile device, instructing the system to reactivate the voicemail functionality;
suspending the voicemail functionality comprises suspending the voicemail functionality until receipt, by the processor, from the roaming mobile device, of the subsequent message instructing the system to reactivate the voicemail functionality; and
reactivating, in response to the subsequent message, the voicemail functionality.

6. The system of claim 1, wherein the operations further comprise initiating, in response to the reactivating and to receiving a voicemail, transmitting a notification message to the mobile device regarding the voicemail.

7. The system of claim 1, wherein the operation of receiving the roaming status message comprises receiving the roaming status message from the roaming mobile device.

8. The system of claim 1, wherein receiving the roaming status message comprises receiving the roaming status message from a notification server.

9. A computer-readable storage device comprising computer-executable instructions that, when executed by a processor, cause the processor to perform operations comprising:
receiving a roaming status message associated with a roaming mobile device;
suspending, in response to receiving the roaming status message, a voicemail functionality of a voicemail account associated with the roaming mobile device; and
reactivating, in response to a trigger condition being met, the voicemail functionality.

10. The computer-readable storage device of claim 9, wherein the roaming status message comprises the trigger condition for reactivating the voicemail functionality.

11. The computer-readable storage device of claim 9, wherein:
the trigger condition comprises a time period for suspending the voicemail functionality;
suspending the voicemail functionality comprises suspending the voicemail functionality for the time period; and
reactivating the voicemail functionality is performed in response to expiration of the time period.

12. The computer-readable storage device of claim 9, wherein:
the trigger condition is one of multiple trigger conditions in the roaming status message for reactivating the voicemail account; and
reactivating the voicemail functionality is performed in response to any of the multiple trigger conditions being met.

13. The computer-readable storage device of claim 9, wherein:
the trigger condition comprises a subsequent message, from the roaming mobile device, instructing the system to reactivate the voicemail functionality;
suspending the voicemail functionality comprises suspending the voicemail functionality until receipt, by the processor, from the roaming mobile device, of the subsequent message instructing the system to reactivate the voicemail functionality; and
reactivating, in response to the subsequent message, the voicemail functionality.

14. The computer-readable storage device of claim 9, wherein the operations further comprise initiating, in response to the reactivating and to receiving a voicemail, transmitting a notification message to the mobile device regarding the voicemail.

15. A method comprising:
receiving, by a system having a processor, a roaming status message associated with a roaming mobile device;

suspending, by the system, in response to receiving the roaming status message, a voicemail functionality of a voicemail account associated with the roaming mobile device; and reactivating, by the system, in response to a trigger condition being met, the voicemail functionality.

16. The method of claim 15, wherein the roaming status message comprises the trigger condition for reactivating the voicemail functionality.

17. The method of claim 16, wherein:

the trigger condition comprises a time period for suspending the voicemail functionality;

suspending the voicemail functionality comprises suspending the voicemail functionality for the time period; and reactivating the voicemail functionality is performed in response to expiration of the time period.

18. The method of claim 15, wherein:

the trigger condition is one of multiple trigger conditions in the roaming status message for reactivating the voicemail account; and reactivating the voicemail functionality is performed in response to any of the multiple trigger conditions being met.

19. The method of claim 15, wherein:

the trigger condition comprises a subsequent message, from the roaming mobile device, instructing the system to reactivate the voicemail functionality;

suspending the voicemail functionality comprises suspending the voicemail functionality until receipt, from the roaming mobile device, of the subsequent message instructing the system to reactivate the voicemail functionality; and reactivating, in response to the subsequent message, the voicemail functionality.

20. The method of claim 15, wherein the operations further comprise initiating, in response to the reactivating and to receiving a voicemail, transmitting a notification message to the mobile device regarding the voicemail.

* * * * *